May 19, 1925                 1,538,138
C. SLOOP
AUTOMOBILE HEATER
Filed June 23, 1923
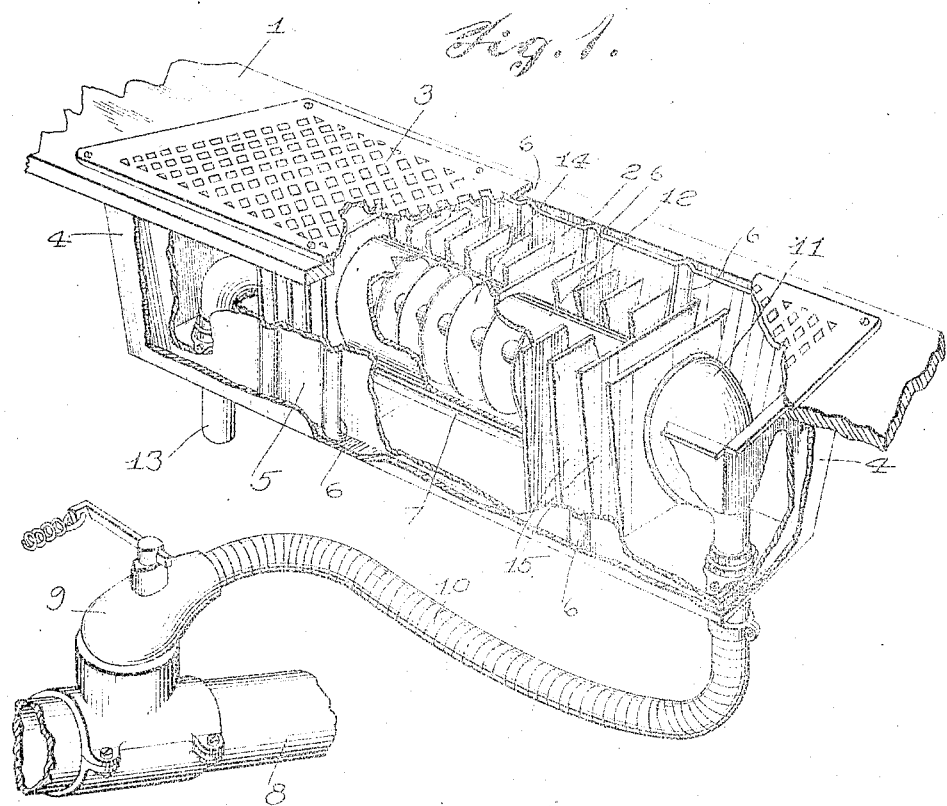
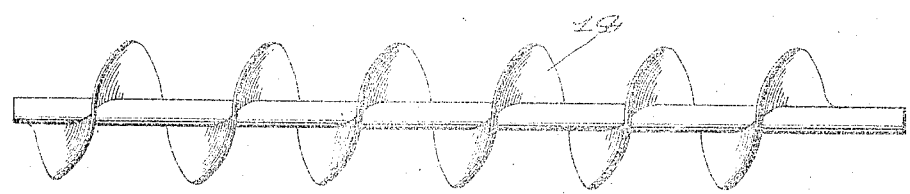
Inventor
Carl Sloop, Patented May 19, 1925.

1,538,138

UNITED STATES PATENT OFFICE.

CARL SLOOP, OF AKRON, OHIO.

AUTOMOBILE HEATER.

Application filed June 23, 1923. Serial No. 647,274.

*To all whom it may concern:*

Be it known that I, CARL SLOOP, a citizen of the United States, and a resident of Akron, in the county of Summit and State of Ohio, have invented certain new and useful Improvements in Automobile Heaters, of which the following is a full, clear, and exact description.

My invention relates to automobile heaters, and one of the objects thereof is to provide a heater of this character which utilizes the waste gases from the engine exhaust for the useful purpose of heating the car.

Another object of the invention is to provide a heater of this character which will not only develop the required amount of heat at all times, but also will evenly distribute the heat over a relatively large area.

Other objects and advantages of the invention reside in the provision of a heater of this character which is extremely simple in construction, and hence is inexpensive in manufacture, and which is composed of an unusually small number of parts, and which is, therefore, not likely to get out of order, as is the case with complicated structures.

Other and further objects and advantages of the invention will be apparent from the following detailed description when taken in connection with the accompanying drawings, in which:

Figure 1 is a perspective view of the complete apparatus, parts being broken away to clearly show the interior construction; and Figure 2 is a detail view of the spiral baffle.

Referring to the drawings more in detail, numeral 1 indicates the floor of an automobile which is provided with a suitable opening indicated by numeral 2. A perforated plate 3 of any desired construction is fitted over the opening, and arranged below the opening is the outer casing 4 of the heater.

I will first describe the means for supplying to the heater the air to be heated, and then the means for heating the air.

As previously stated, the outer casing or pan is indicated by numeral 4, and arranged within and spaced therefrom is a second casing or pan indicated by numeral 5. The inner pan or casing may be spaced from the outer pan or casing by any desired construction, but I prefer that the spacing be accomplished by stamping or otherwise forming on the inner pan a series of corrugations indicated by numeral 6. The bottom of the inner pan is provided along its center line with a slot 7, or equivalent means, for permitting the air to rise from the space between the two pans into the interior of the inner pan.

The operation of the air supplying means will be obvious from the foregoing description. The cool air is drawn downwardly between the walls of the two casings or pans, and then passes upwardly through the bottom of the inner pan into the interior thereof where it comes into direct contact with the heating means; and it will be understood, of course, that the air receives a preliminary heating while it is being drawn through the space between the two pans on its way to the interior of the inner pan.

The engine exhaust pipe is indicated by numeral 8, and operatively associated with this exhaust pipe is any desired type of valve 9 for shunting all or a portion of the exhaust gases to the heater. For conveying the exhaust gases from the valve to the heater I preferably provide a flexible tube 10, and the end of this tubing is connected with an elbow 11, which in turn is connected to a cylindrical tube 12. The exhaust gases pass through the length of the cylindrical tube 12 and pass out the opposite end thereof through the pipe 13.

In order to retard the passage of the gases through the tube 12, and thus give ample time for the gases to give off their heat, I mount in the tube a spiral baffle 14, shown in detail in Figure 2. By providing a baffle of this character the gases are caused to travel through a long and circuitous course and are thus given ample time to give off their heat; but, in addition to this function, the gases by being forced to travel round and round in the tube evenly heat the same on all sides, and obviously this results in a much greater absorption of heat. Welded to, or cast integral with, the tube 12 is a series of fins 15, the function of the fins being to assist in rapidly radiating the heat absorbed from the waste gases.

The operation of the apparatus will be clearly understood from the foregoing description. When it is desired to heat the car the valve 9 is opened to the desired extent, thereby allowing a portion or all of the exhaust gases to be delivered to the cylindrical tube 12. The spiral baffle 14 causes the gases to follow a long and circuitous course, thereby permitting the heat of the gases to be absorbed evenly throughout the entire body of the cylindrical tube. The heat thus absorbed from the exhaust gases is rapidly radiated by the fins 15, and the heat thus radiated is employed to heat the incoming air, which has received a preliminary heating during its passage through the space between the two pans or casings.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. An automobile heater, including a double casing having spaced walls, means for drawing air through the space between the walls and into the interior of the inner casing, a tubular member arranged within the inner casing, means for causing the exhaust gases to pass through the tubular member, and means arranged within the tubular member to cause the gases to travel through a spiral path.

2. An automobile heater, including a double casing having spaced walls, means for drawing air through the space between the walls and into the interior of the inner casing, a tubular member arranged within the inner casing, radiating fins carried by the tubular member and supporting the same, a spiral baffle centrally arranged in the tubular member, and means for causing the exhaust gases to pass through the tubular member.

CARL SLOOP.